Patented Apr. 10, 1945

2,373,630

UNITED STATES PATENT OFFICE 2,373,630

MIXED CELLULOSE ESTERS

Mervin E. Martin and Troy M. Andrews, Cumberland, Md., assignors to Celanese Corporation of America, a corporation of Delaware No Drawing. Application December 17, 1943,
Serial No. 514,664

16 Claims. (Cl. 260—225)

This invention relates to the preparation of mixed organic esters of cellulose and relates more particularly to the preparation of mixed organic esters of cellulose of improved clarity, color and molding properties.

An object of our invention is the provision of a process for the preparation of mixed organic esters of cellulose of improved clarity and color.

Another object of our invention is the preparation of fully esterified mixed organic esters of cellulose which are free of residual acidity and which do not develop any acidity when subjected to molding operations.

Other objects of our invention will appear from the following detailed description.

While our invention will be more particularly described in connection with the preparation of cellulose acetate-butyrates of high clarity and free of residual acid, it is to be understood, however, that our novel process may be employed for the preparation of other mixed organic esters of cellulose such as, for example, cellulose acetate-propionate, cellulose propionate-butyrate and the like.

Mixed organic esters of cellulose, such as cellulose acetate-butyrate, have been prepared by esterifying cellulose with an esterification mixture containing an esterification catalyst and the desired acetyl and butyryl groups, present in the form of the respective acids or anhydrides. By suitably adjusting the relative proportions of acetyl and butyryl radicals in the esterification mixture, mixed cellulose esters containing any desired proportion of acetyl and butyryl groups may be produced. Where it is desired to prepare a mixed ester containing a relatively high proportion of butyryl radicals, the esterification mixture may comprise acetic acid, butyric acid and butyric anhydride, and where a mixed cellulose ester containing a relatively high proportion of acetyl radicals is desired the esterification mixture may comprise acetic acid, butyric acid and acetic anhydride. Thus, in the preparation of a fully esterified cellulose acetate-butyrate containing a relatively high proportion of butyryl radicals, the esterification mixture may comprise for each part by weight of cellulose from 0.50 to 1.35 parts by weight of acetic acid, from 0.50 to 1.25 parts of butyric acid, from 3.0 to 8.0 parts of butyric anhydride and from .005 to 0.10 part by weight of an esterification catalyst, such as sulfuric acid, perchloric acid, phosphoric acid and zinc chloride-hydrochloric acid. Usually, the cellulose is pretreated prior to esterification for the purpose of rendering the cellulose more reactive.

The pretreatment may comprise immersing the cellulose in a mixture of the acids employed for esterification. A part of the acids to be used for the esterification may be employed for the pretreatment or, preferably, the cellulose is immersed in a mixture containing all of the acetic and butyric acid to be used for the esterification, and, after pretreatment for 1 to 24 hours at 12° C. to 60° C., the pretreated cellulose may then be esterified by the addition of the butyric anhydride and the catalyst.

The esterification is usually effected, after cooling the mixture of pretreated cellulose and the acids to a temperature of $-10°$ C. to $+8°$ C., by adding to this cooled mixture the butyric anhydride and the esterification catalyst. The butyric anhydride may also be cooled, if desired, to a temperature of $-10°$ C. to $+8°$ C. before being added to the pretreated cellulose. Preferably, sufficient cooling is employed to maintain the exothermic esterification reaction under control and to limit the peak temperature reached during the reaction to a point, preferably, no higher than about 30° C. In some instances, external cooling may also be employed. Esterification is usually completed in from 5 to 12 hours and a hazy solution of cellulose acetate-butyrate in the acids employed for esterification is obtained. The cellulose acetate-butyrate in solution may then be ripened or hydrolyzed, if an ester containing free hydroxyl groups is desired. The ripening may be effected after a part of the catalyst has been neutralized, excess anhydride has been converted to the corresponding acid with water, and additional water for ripening has been added. After ripening, the cellulose acetate-butyrate is precipitate, washed and dried.

Mixed organic esters of cellulose, prepared as described, in which all or substantially all of the hydroxyl groups of the cellulose molecule are combined with the acyl groups of different organic acids, are valuable for molding operations. To be satisfactory for commercial molding operations these mixed organic esters of cellulose should yield molded products of high clarity and, in addition, the molded products should be free of acidity present either in the cellulose esters from which the molded products are prepared, or developed during molding due to the high temperatures to which the cellulose esters are exposed during molding operations. Mixed organic esters of cellulose prepared in accordance with prior processes do not meet these requirements and are of a very limited value only.

We have now discovered that mixed organic esters of cellulose such as, for example, cellulose acetate-butyrate of relatively high butyryl value may be obtained in a form substantially free of residual acidity and possessing high clarity by a novel process involving improved esterification and precipitation procedures. In accordance with our novel process, we have found that the clarity of cellulose acetate-butyrate of relatively high butyryl value, esterified for example, by means of an esterification mixture comprising acetic acid, butyric acid, butyric acid anhydride and an esterification catalyst, may be substantially improved if, following esterification and prior to any ripening, a mixture of acetic anhydride and additional esterification catalyst is added to the esterification mixture and the cellulose ester solution is allowed to stand for a short time until it clears. The addition of the anhydride and esterification catalyst is made at a point where substantially all of the cellulose is esterified and this addition effects the complete esterification of that small portion of the cellulose usually present in the esterification mixture which, under the conditions obtaining before the catalyst and anhydride addition, is not ordinarily further esterified and contributes to the lack of clarity. The cellulose ester may then be ripened, if desired, after the excess anhydride has been destroyed by the addition of water, part, or all, of the catalyst neutralized and a suitable amount of water for ripening has been added. Advantageously, where fully esterified cellulose esters are desired, a part, or even all, of the catalyst may be neutralized, excess anhydride destroyed with water, and after additional water is added, the cellulose ester in solution may be allowed to stand at a temperature not sufficiently high to effect any hydrolysis before being precipitated. By this step any combined mineral acid in the fully esterified cellulose esters is removed and cellulose esters of particularly valuable stability characteristics are obtained. Furthermore, we have found that if acetone or other inert miscible solvent for the cellulose acetate-butyrate is then added to the solution of the cellulose ester prior to precipitation, the residual acidity in the ester, obtained after subsequent precipitation and washing, is decreased even more and little or no acidity is developed when the cellulose esters so prepared are subjected to molding operations.

Advantageously, we add from 0.1 to 0.5 part by weight of acetic anhydride to the solution of cellulose acetate-butyrate for each part by weight of cellulose esterified and from 0.0005 to 0.05 part by weight of additional esterification catalyst. When the solution has cleared, usually in from ½ to 2 hours, sufficient water is added to destroy the unreacted acetic and butyric anhydrides. Part, say 50% or more, or even all, of the catalyst present may be neutralized by the addition of a suitable agent such as hydrated magnesium acetate, zinc acetate, aluminum acetate, aluminum chloride or calcium acetate, and from 0.50 to 2.0 parts of water, based on the original cellulose, are added. The cellulose acetate-butyrate may then be ripened at temperatures sufficiently high to effect hydrolysis, i. e. up to about 60° C. for 1 to 24 hours or, where fully esterified cellulose esters are desired, allowed to stand for like period with all the catalyst neutralized without effecting any hydrolysis of the acyl groups but removing combined mineral acid. At this point from 0.5 to 2.0 parts by volume of acetone or other inert solvent for the cellulose acetate-butyrate, such as dioxan, methyl acetate, methanol or ethanol, are added to the solution. The solution containing the inert solvent is agitated for 5 to 10 minutes and the cellulose acetate-butyrate is then precipitated from solution by the addition of excess water thereto. The precipitated ester may then be washed and dried. The cellulose acetate-butyrate prepared in accordance with the present process exhibits excellent clarity and is not only unusually free of residual acidity in the precipitated flake form, but it develops substantially no acidity after being subjected to molding operations at elevated temperature and pressure.

The cellulosic materials esterified in accordance with our process may be any suitable form of cellulose or cellulose derivative. It may be cotton, cotton linters, wood pulp, regenerated cellulose, or other cellulosic material obtainable from various other sources such as grasses, straws, hulls, waste material such as bagasse, and the like.

In order further to illustrate our invention but without being limited thereto the following example is given:

Example 25 parts by weight of cotton linters are pretreated by immersion in a mixture comprising 31.25 parts by weight of acetic acid and 18.75 parts by weight of butyric acid at 23° C. for 18 hours. There is then added to the mixture of pretreated cotton and acids 100 parts by weight of butyric anhydride cooled to −2° C. containing 0.185 part by weight of perchloric acid. The reaction mixture is stirred and the temperature of the reaction rises, reaching a peak of 25° C., and the esterification is then continued at a temperature of 20 to 22° C., with stirring, for 9 hours. At this point there is added 5 parts by weight of acetic anhydride and 0.015 part by weight of perchloric acid and the reaction mixture is again agitated for another hour making a total esterification time of about 10 hours. At the completion of esterification 8 parts by weight of water are stirred into the solution and this addition is followed by the further addition of 21 parts by weight of water containing 0.4 part by weight of hydrated magnesium acetate to neutralize all of the perchloric acid present. The cellulose acetate-butyrate is allowed to stand for 16 hours at 23 to 25° C. without hydrolysis to effect a removal of combined mineral acid. One volume of acetone is stirred in and after agitation of the solution for 10 minutes, the cellulose acetate-butyrate is precipitated from solution by the addition of excess water thereto and the precipitated ester is then washed neutral and dried. The cellulose acetate-butyrate obtained is fully esterified, having no free hydroxyl groups, and exhibits unusual freedom from residual acidity either in the flake form or after being subjected to molding operations.

It is to be understood that the foregoing detailed description is given merely by way of illustration and that many variations may be made therein without departing from the spirit of our invention.

Having described our invention, what we desire to secure by Letters Patent is:

1. Process for the production of mixed organic esters of cellulose of high clarity and possessing at most a relatively low residual acidity, which comprises esterifying cellulose in an esterification bath comprising two different lower aliphatic acids, the acid anhydride of one of said acids and an esterification catalyst, adding the anhydride of the other of said acids and additional catalyst to the esterification mixture at a point where substantially all of the cellulose is esterified, ripening the cellulose ester and then adding a solvent for the cellulose ester to the ripened solution prior to precipitation.

2. Process for the production of mixed organic esters of cellulose of high clarity and possessing at most a relatively low residual acidity, which comprises esterifying cellulose in an esterification bath comprising two different lower aliphatic acids, the acid anhydride of one of said acids and an esterification catalyst, adding the anhydride of the other of said acids and additional catalyst to the esterification mixture at a point where substantially all of the cellulose is esterified, neutralizing a part of the catalyst, ripening the cellulose ester and then adding a solvent for the cellulose ester to the ripened solution prior to precipitation.

3. Process for the production of cellulose acetate-butyrate of high clarity and possessing at most a relatively low residual acidity, which comprises esterifying cellulose in an esterification bath comprising acetic acid, butyric acid, butyric anhydride and an esterification catalyst, adding acetic anhydride and additional catalyst to the esterification mixture at a point where substantially all of the cellulose is esterified, neutralizing a part of the catalyst, ripening the cellulose acetate-butyrate to the desired degree and then adding a solvent for the cellulose acetate-butyrate to the ripened solution prior to precipitation.

4. Process for the production of fully esterified mixed organic esters of cellulose of high clarity and possessing at most a relatively low residual acidity, which comprises esterifying cellulose in an esterification bath comprising two different lower aliphatic acids, the acid anhydride of one of said acids and an esterification catalyst, adding the anhydride of the other of said acids and additional catalyst to the esterification mixture at a point where substantially all of the cellulose is esterified, allowing the esterification mixture to stand without effecting hydrolysis and then adding a solvent for the cellulose ester to the solution prior to precipitation.

5. Process for the production of fully esterified mixed organic esters of cellulose of high clarity and possessing at most a relatively low residual acidity, which comprises esterifying cellulose in an esterification bath comprising two different lower aliphatic acids, the acid anhydride of one of said acids and an esterification catalyst, adding the anhydride of the other of said acids and additional catalyst to the esterification mixture at a point where substantially all of the cellulose is esterified, neutralizing all of the catalyst, allowing the esterification mixture to stand without effecting hydrolysis and then adding a solvent for the cellulose ester to the solution prior to precipitation.

6. Process for the production of fully esterified cellulose acetate-butyrate of high clarity and possessing at most a relatively low residual acidity, which comprises esterifying cellulose in an esterification bath comprising acetic acid, butyric acid, butyric anhydride and an esterification catalyst, adding acetic anhydride and additional catalyst to the esterification mixture at a point where substantially all of the cellulose is esterified, allowing the esterification mixture to stand without effecting hydrolysis and then adding a solvent for the cellulose acetate-butyrate to the solution prior to precipitation.

7. Process for the production of fully esterified cellulose acetate-butyrate of high clarity and possessing at most a relatively low residual acidity, which comprises esterifying cellulose in an esterification bath comprising acetic acid, butyric acid, butyric anhydride and an esterification catalyst, adding acetic anhydride and additional catalyst to the esterification mixture at a point where substantially all of the cellulose is esterified, neutralizing all of the catalyst, allowing the esterification mixture to stand without effecting hydrolysis and then adding a solvent for the cellulose acetate-butyrate to the solution prior to precipitation.

8. Process for the production of fully esterified cellulose acetate-butyrate of high clarity and possessing at most a relatively low residual acidity, which comprises esterifying cellulose in an esterification bath comprising acetic acid, butyric acid, butyric anhydride and perchloric acid as esterification catalyst, adding acetic anhydride and additional perchloric acid to the esterification mixture at a point where substantially all of the cellulose is esterified, allowing the esterification mixture to stand without effecting hydrolysis and then adding a solvent for the cellulose acetate-butyrate to the solution prior to precipitation.

9. Process for the production of fully esterified cellulose acetate-butyrate of high clarity and possessing at most a relatively low residual acidity, which comprises esterifying cellulose in an esterification bath comprising acetic acid, butyric acid, butyric anhydride and perchloric acid as esterification catalyst, adding acetic anhydride and additional perchloric acid to the esterification mixture at a point where substantially all of the cellulose is esterified, neutralizing all of the catalyst, allowing the esterification mixture to stand without effecting hydrolysis and then adding a solvent for the cellulose acetate-butyrate to the solution prior to precipitation.

10. Process for the production of fully esterified cellulose acetate-butyrate of high clarity and possessing at most a relatively low residual acidity, which comprises esterifying cellulose in an esterifying bath comprising from 0.5 to 1.35 parts by weight of acetic acid, from 0.50 to 1.25 parts by weight of butyric acid, from 3.0 to 8.0 parts by weight of butyric anhydride and from 0.005 to 0.10 part by weight of perchloric acid as esterification catalyst, adding acetic anhydride and additional perchloric acid to the esterification mixture at a point where substantially all of the cellulose is esterified, neutralizing all of the catalyst, allowing the esterification mixture to stand without effecting hydrolysis and then adding a solvent for the cellulose acetate-butyrate to the solution prior to precipitation.

11. Process for the production of fully esterified cellulose acetate-butyrate of high clarity and possessing at most a relatively low residual acidity, which comprises esterifying cellulose in an esterifying bath comprising from 0.5 to 1.35 parts by weight of acetic acid, from 0.50 to 1.25 parts by weight of butyric acid, from 3.0 to 8.0 parts by weight of butyric anhydride and from 0.005 to 0.10 part by weight of perchloric acid as esterification catalyst, adding 0.2 to 1.0 part by weight of acetic anhydride and additional perchloric acid to the esterification mixture at a point where substantially all of the cellulose is esterified, neutralizing all of the catalyst, allowing the esterification mixture to stand without effecting hydrolysis and then adding a solvent for the cellulose acetate-butyrate to the solution prior to precipitation.

12. Process for the production of fully esterified cellulose acetate-butyrate of high clarity and possessing at most a relatively low residual acidity, which comprises esterifying cellulose in an esterifying bath comprising from 0.5 to 1.35 parts by weight of acetic acid, from 0.5 to 1.25 parts by weight of butyric acid, from 3.0 to 8.0 parts by weight of butyric anhydride and from 0.005 to 0.10 part by weight of perchloric acid as esterification catalyst, adding 0.2 to 1.0 part by weight of acetic anhydride and 0.0002 to 0.05 part by weight of additional perchloric acid to the esterification mixture at a point where substantially all of the cellulose is esterified, neutralizing all of the catalyst, allowing the esterification mixture to stand without effecting hydrolysis and then adding a solvent for the cellulose acetate-butyrate to the solution prior to precipitation.

13. Process for the production of fully esterified cellulose acetate-butyrate of high clarity and possessing at most a relatively low residual acidity, which comprises esterifying cellulose in an esterifying bath comprising from 0.5 to 1.35 parts by weight of acetic acid, from 0.5 to 1.25 parts by weight of butyric acid, from 3.0 to 8.0 parts by weight of butyric anhydride and from 0.005 to 0.10 part by weight of perchloric acid as esterification catalyst, adding 0.2 to 1.0 part by weight of acetic anhydride and 0.0002 to 0.05 part by weight of additional perchloric acid to the esterification mixture at a point where substantially all of the cellulose is esterified, neutralizing all of the catalyst, allowing the esterification mixture to stand for from 1 to 24 hours at 12 to 60° C. and then adding a solvent for the cellulose acetate-butyrate to the solution prior to precipitation.

14. Process for the production of fully esterified cellulose acetate-butyrate of high clarity and possessing at most a relatively low residual acidity, which comprises esterifying cellulose in an esterifying bath comprising from 0.5 to 1.35 parts by weight of acetic acid, from 0.5 to 1.25 parts by weight of butyric acid, and from 0.005 to 0.10 part by weight of perchloric acid as esterification catalyst, adding acetic anhydride and additional perchloric acid to the esterification mixture at a point where substantially all of the cellulose is esterified, neutralizing all of the catalyst, allowing the esterification mixture to stand without effecting hydrolysis and then adding acetone to the solution prior to precipitation.

15. Process for the production of fully esterified cellulose acetate-butyrate of high clarity and possessing at most a relatively low residual acidity, which comprises esterifying cellulose in an esterifying bath comprising from 0.5 to 1.35 parts by weight of acetic acid, from 0.5 to 1.25 parts by weight of butyric acid, from 3.0 to 8.0 parts by weight of butyric anhydride and from 0.005 to 0.10 part by weight of perchloric acid as esterification catalyst, adding acetic anhydride and additional perchloric acid to the esterification mixture at a point where substantially all of the cellulose is esterified, neutralizing all of the catalyst, and then allowing the esterification mixture to stand without effecting hydrolysis and adding from 1 to 2 parts by volume of acetone to the solution prior to precipitation.

16. Process for the production of fully esterified cellulose acetate-butyrate of high clarity and possessing at most a relatively low residual acidity, which comprises esterifying cellulose in an esterifying bath comprising from 0.5 to 1.35 parts by weight of acetic acid, from 0.5 to 1.25 parts by weight of butyric acid, from 3.0 to 8.0 parts by weight of butyric anhydride and from 0.005 to 0.10 part by weight of perchloric acid as esterification catalyst, adding acetic anhydride and additional perchloric acid to the esterification mixture at a point where substantially all of the cellulose is esterified, neutralizing all of the catalyst, allowing the reaction mixture to stand for 1 to 24 hours without effecting hydrolysis and adding from 1 to 2 parts by volume of acetone to the solution prior to precipitation.

MERVIN E. MARTIN.
TROY M. ANDREWS.